US007386456B2

(12) United States Patent
Algazi

(10) Patent No.: US 7,386,456 B2
(45) Date of Patent: *Jun. 10, 2008

(54) SYSTEM AND METHODS FOR TRANSPORTATION AND DELIVERY USING BAR CODES

(75) Inventor: Allan Stuart Algazi, Succasunna, NJ (US)

(73) Assignee: Symbol Technologies, Inc., Holtsville, NY (US)

( * ) Notice: Subject to any disclaimer, the term of this patent is extended or adjusted under 35 U.S.C. 154(b) by 1482 days.

This patent is subject to a terminal disclaimer.

(21) Appl. No.: 09/759,566

(22) Filed: Jan. 11, 2001

(65) Prior Publication Data

US 2002/0091537 A1 Jul. 11, 2002

Related U.S. Application Data

(60) Provisional application No. 60/246,222, filed on Nov. 6, 2000.

(51) Int. Cl.
G06Q 99/00 (2006.01)

(52) U.S. Cl. .......................................... 705/1
(58) Field of Classification Search .................. 705/1
See application file for complete search history.

(56) References Cited

U.S. PATENT DOCUMENTS

| 5,647,017 | A | * | 7/1997 | Smithies et al. ............ 382/119 |
|---|---|---|---|---|
| 5,838,812 | A |   | 11/1998 | Pare, Jr. et al. ............ 382/115 |
| 5,869,819 | A |   | 2/1999 | Knowles et al. ............ 235/375 |
| 5,872,834 | A |   | 2/1999 | Teitelbaum ............ 379/93.03 |
| 6,028,517 | A | * | 2/2000 | Sansone et al. ............ 340/569 |
| 6,069,969 | A | * | 5/2000 | Keagy et al. ............... 382/124 |
| 6,070,793 | A | * | 6/2000 | Reichl et al. ............... 235/375 |
| 6,114,959 | A | * | 9/2000 | Bennett ....................... 340/569 |
| 6,256,737 | B1 |  | 7/2001 | Bianco et al. .............. 713/186 |
| 6,323,782 | B1 | * | 11/2001 | Stephens et al. ......... 340/10.31 |
| 6,439,345 | B1 | * | 8/2002 | Recktenwald et al. ........ 186/55 |
| 6,802,005 | B1 | * | 10/2004 | Berson ....................... 713/178 |
| 2002/0107820 | A1 | * | 8/2002 | Huxter ....................... 705/402 |

FOREIGN PATENT DOCUMENTS

| WO |   | 96/03286 | 2/1996 | ................... 15/10 |
|---|---|---|---|---|
| WO | WO 03/036861 | * | 5/2004 | |

OTHER PUBLICATIONS

Providing Visual and Audio Feedback for Recognition Events, Jan. 1, 1996, IBM Technical Disclosure Bulletin, vol. 39, Issue 1, pp. 75-76.*
Gurton, Annie, Dawn of the Age of Smart Assets, Nov. 23, 2000, Computer Weekly, p. 38.*
WizCom Technologies Ltd. and Axtel Inc. Sign Agreement to Integrate Barcode Recognition Capabilities into WizCom's Second Generation Products, Aug. 14, 2000, Business Wire.*

* cited by examiner

Primary Examiner—Jamisue A. Plucinski
(74) Attorney, Agent, or Firm—Fay Kaplun & Marcin, LLP

(57) ABSTRACT

A method of obtaining a package is described. A user is electronically notified that a package has arrived at a predetermined location. The user then prints a paper receipt including a two-dimensional bar code encoding the user's previously provided biometric information. At the predetermined location, the user scans the two-dimensional bar code, which is decoded to obtain the previously provided biometric information. The user also conveys current biometric information. If the user's current biometric information is equivalent to the user's current biometric information, a retrieval devices provides the package to the user.

24 Claims, 5 Drawing Sheets

FIG. 4

MIRS RECEIPT

Dear Mr. Jones:

Your Package Has Arrived!

Shipped By:      Symbol Technologies, Inc.
One Symbol Plaza
Holstville, NY 11742-1300

Contents:      5 Spectrum 24 11 Megabit Wireless LAN Cards

Package Location:      MIRS Central
One Ohio Road
Anywhere, OH 22222

Instructions:

1. Go to the MIRS Location
2. Sign in the space indicated
3. Allow the MIRS to scan your signature and the bar code
4. Retrieve your package Scan Below      AND      Scan Below

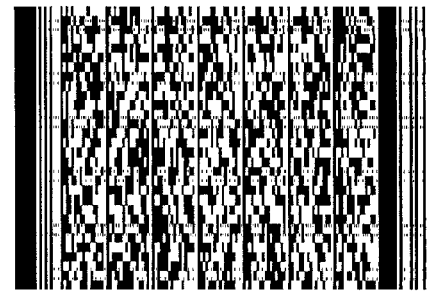

_____

Sign Here

DO NOT SIGN UNTIL YOU HAVE ARRIVED AT THE MIRS!

FIG. 4A

MIRS RECEIPT

Dear Mr. Jones:

Your Package Has Arrived!

Shipped By:        Symbol Technologies, Inc.
                      One Symbol Plaza
                      Holstville, NY 11742-1300

Contents:          5 Spectrum 24 11 Megabit Wireless LAN Cards

Package Location:    MIRS Central
                      One Ohio Road
                      Anywhere, OH 22222

Instructions:

1. Go to the MIRS Location
2. Sign in the space indicated
3. Allow the MIRS to scan your signature and the bar code
4. Retrieve your package Scan Below                 AND              Scan Below

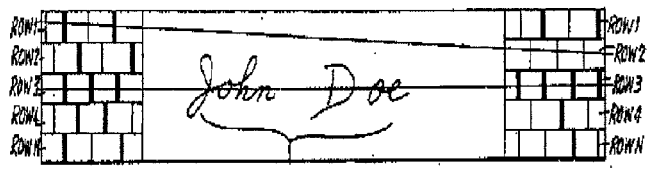 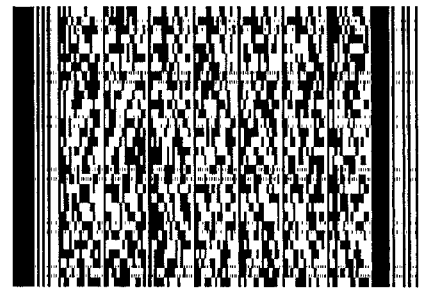

Sign In The Space Above
DO NOT SIGN UNTIL YOU HAVE ARRIVED AT THE MIRS!

SYSTEM AND METHODS FOR TRANSPORTATION AND DELIVERY USING BAR CODES

REFERENCE TO RELATED APPLICATIONS

This application claims the benefit of provisional application of U.S. Ser. No. 60/246,222, filed Nov. 6, 2000.

BACKGROUND OF THE INVENTION

The present invention relates to an improved system for transportation and delivery using bar codes to uniquely identify customers and delivered goods in a secure and quick manner.

The Internet has produced a proliferation of e-commerce transactions. While e-commerce transactions offer convenience and speed to customers seeking to purchase goods online, most e-commerce transactions must end with the physical delivery of goods to a consumer. Indeed, the delivery stage is particularly prone to error or sabotage as goods may be inadvertently or maliciously routed to the wrong destination. The ability to secure the delivery of goods to the consumer in a manner that inspires confidence in both parties would be of great benefit to both providers of goods and the consumers who use them.

SUMMARY OF THE INVENTION

Therefore, the proposals of the related art fail to comprehensively overcome the problems discussed above and other related problems. Advantages of this invention will be set forth in part in the description which follows, and in part will be obvious from the description, or may be learned by practice of the invention. The advantages of the invention will be realized and attained by means of the elements and combinations particularly pointed out in the appended claims.

The present invention provides an improved method for the handling of packages and other e-commerce transactions using bar code technology and, in particular, the use of the security features available in two-dimensional bar codes, such as, for example, PDF-417, which was developed by Symbol Technologies, Inc., the assignee of the present invention. In further embodiments, the security of a transaction is assured by using the ability of a two-dimensional bar code to reliably verify the identity of a participant in the transaction by comparing biometric data provided by the user in a one-time secure transaction (which is recorded within the two-dimensional bar code) and biometric data provided by the user of the system just prior to entering a transaction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 4 illustrates a sample receipt that may be used in practicing an embodiment of the present invention.

FIG. 4A illustrates another form of a sample receipt that may be used in practicing an embodiment of the present invention.

DETAILED DESCRIPTION OF THE EMBODIMENTS

Figure 1:
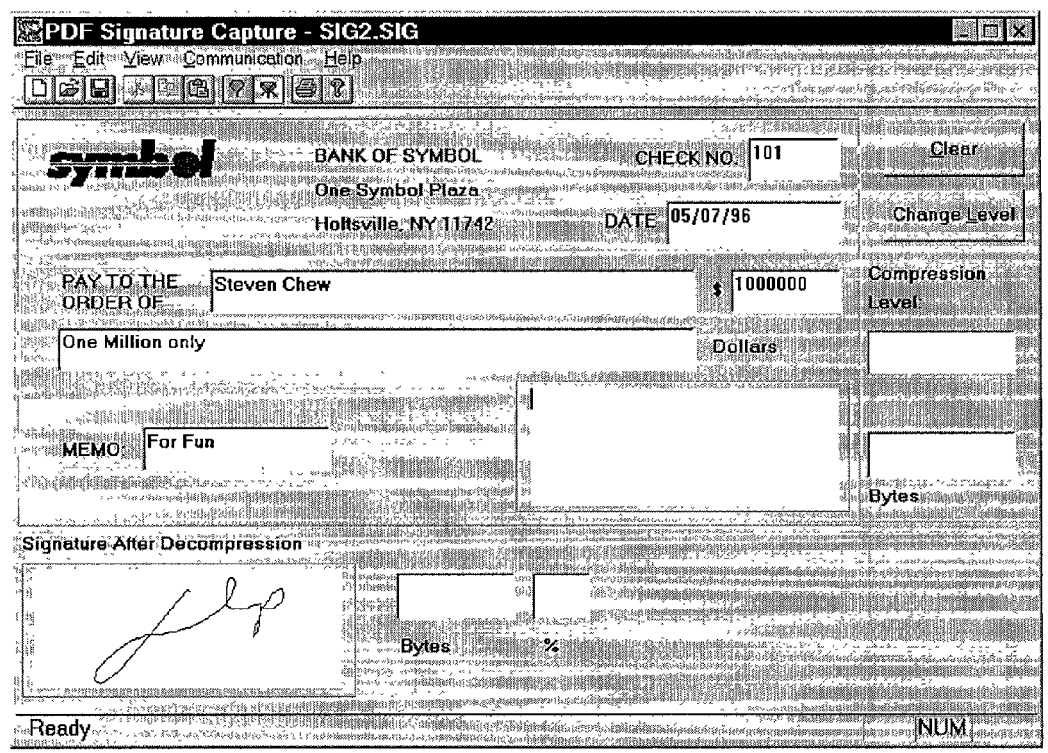
FIG. 1 illustrates a computer program capable of printing a check with a two-dimensional bar code.

Reference will now be made in detail to the embodiments of the invention, examples of which are illustrated in the accompanying drawings.

The proper identification of a party in a proposed transaction of goods, information or services may be ascertained by the use of a two-dimensional bar code. The need to encode more information in a smaller space has driven the development, standardization, and growing use of two-dimensional bar codes. Where traditional one-dimensional bar codes act as a pointer to reference information stored in a database, two-dimensional codes can function as the database itself, and therefore assure complete portability for two-dimensional labeled items.

For example, PDF417, or Portable Data File 417, is a two-dimensional stacked bar code symbology capable of encoding over a kilobyte of data per label. The "portable data file" approach is well suited to applications where it is impractical to store item information in a database or where the database is not accessible when and where the item's bar code is read In addition, PDF417 is an error-correcting symbology designed for real-world applications where portions of labels can get destroyed in handling. It performs error correction by making calculations, if necessary, to reconstruct undecoded or corrupted portions of the symbol. A user may define one of 9 error correction levels labelled levels 0 to 8. All error correction levels, except Level 0, not only detect errors but also can correct erroneously decoded or missing information.

PDF 417 also has the feature of Macro PDF417. This mechanism allows files of data to be represented logically and consecutively in a number of 'PDF417' symbols. Up to 99,999 different PDF417 symbols can be so linked or concatenated and be scanned in any sequence to enable the original data file to be correctly reconstructed. In particular, PDF417 has been demonstrated to be effective in communicating large data files and to be easily scannable with existing proven hand-held technologies. Successful installations and broad supplier support further supported its selection. Detailed decision factors included:

Demonstrated robust error correction

Demonstrated to be readable with a wide range of scanner technologies including laser, linear CCD and imagers Demonstrated robust non-contact reading performance Best backward compatibility with the scanning of one-dimensional bar codes in existing applications.

Proven track record and field performance

Based on the versatility of the two-dimensional bar code, it is possible to use the code as a key to access information. For example, a consumer desiring certain information or goods from a provider presents a bar code previously obtained from the provider which encodes information about the consumer that only the consumer himself or herself can verify. If the provider matches the information from the bar code with the information presently provided characteristics of the user, the provider can allow access to the desired information or goods without fear that a fraud or mistake has taken place.

Figure 2:
FIG. 2 illustrates a check incorporating a two-dimensional bar code that includes signature information printed using a computer program.

For example, as illustrated in FIG. 1, a computer program is used to generate a request to print a check. The user inputs the requisite information including his or her signature using, for example, a pen tablet. The computer program then prints a check similar to the form in FIG. 2, which includes information about the user's signature and other pertinent data encoded in the PDF 417 bar code on the check. The user then may sign the check in the normal fashion in the lower right hand corner. Upon receipt, the bank may verify the authenticity of the signature by scanning both the PDF 417 bar code and the signature and comparing them. If they are substantially identical, the authenticity is verified. This concept can be expanded to include any type of biometric data such as facial appearance, signatures, thumbprints, handprints, voice prints and retinal scans and any type of transaction where a secure and inexpensive method of authentication is desired by each party.

In an embodiment of the present invention, a Mail Item Retrieval System (MIRS) may be utilized. There are 38,000 retail postal locations and an unlimited number of non-USPS commercial sites where MIRS can be located. The MIRS provides customers with the freedom to pick up their package 24 hours a day, seven days a week. In a further embodiment, the MIRS may be located at a user's home or place of business.

The MIRS is based on the concept that each user need only provide select biometric data to the MIRS provider once in a secure fashion. At this time, the user also provides his or her location information which may include the user's address, phone numbers and e-mail contacts. The user may also provide financial information to the MIRS, such as a credit card number. This biometric data is then stored into the MIRS to be encoded into future two-dimensional bar codes provided to the user in electronic format and thereafter printed by the user on his or her personal printer. The MIRS may also provide security guarantees that creates a firewall between the biometric information.

Once an account is established with the MIRS, the user may directs that providers of goods send merchandise purchased over the phone or the Internet be sent to his or her mailbox account with the MIRS. Providers and other providers of goods and services may also interact with the MIRS provider.

Figure 3:
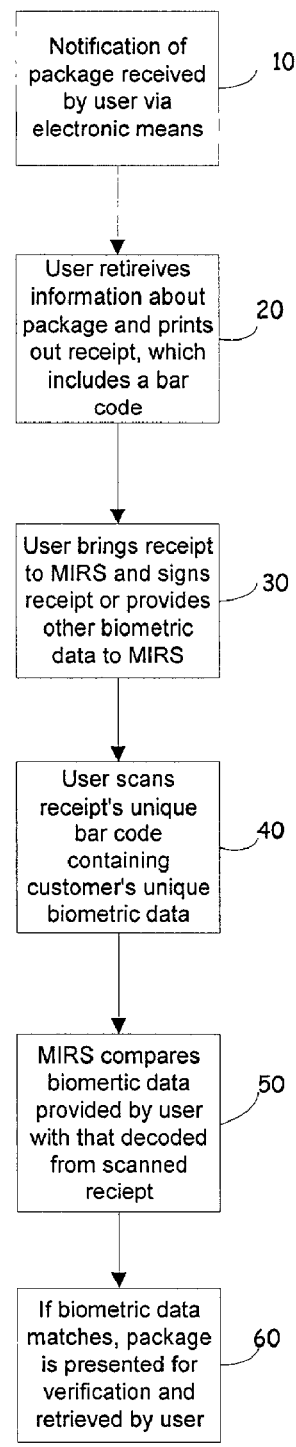
FIG. 3 illustrates in flowchart form a method of practicing an embodiment of the present invention.

Turning now to FIG. 3, shown is a flowchart of using the MIRS, which is an embodiment of the present invention. In step 10, a user receives notification of a package's arrival at the MIRS facility. Such a notification could occur via voicemail, electronic mail, a cell phone, a pager or a PDA. The notification will include an attachment for printing an appropriate receipt. In step 20, the user at his or her convenience retrieves the information about the package received and in particular obtain a printed copy of a receipt including such information. The receipt will include a two-dimensional bar code, such as PDF which will incorporate information provided by the user to identify himself or herself previously to the system The bar code on the receipt may contain biometric data that is a unique to the user and that has been previously provided in a secure manner to the entity providing the notification service. Such biometric data may include, for example, voice-print fingerprint, hand-print, retinal scan information, signature information, facial features or any other unique identifying features about the user. As shown in FIG. 4, the printed receipt obtained may also include information necessary for the user to obtain the package. Such information may include the nature of the package, the dimensions of the package and the location where the package currently resides. The security of the MIRS is guaranteed by the fact that the receipt cannot be used to retrieve the package from the MIRS unless and until it is countersigned by the correct user. If anyone other than the correct user attempts to sign the receipt and retrieve the package, the MIRS will not release the package because the biometric signature information contained in the two-dimensional bar code and the signature will not match. This security technique may also be used for other biometric data.

Returning to FIG. 3, in step 30, the user brings the printed receipt to of the location of the package, at this location the user then it provides the required biometric data to the package provider. For example, the user may affix his or her signature on the printed receipt just prior to arriving at the package retrieval facility. As shown in step 40, at the package retrieval facility which may be at a post office or other central location or even an the user's home, the user has the MIRS scan the two-dimensional bar code and also provides the necessary biometric data to the retrieval system. The act of providing such data may be accomplished by signing the receipt in the space indicated and having the MIRS scan the signature or by providing a retinal scan handprint, fingerprint or voice print to the MIRS. Alternatively, the MIRS could use a camera to scan the facial features of the user and compare the biometric data retrieved from that scan with the biometric data retrieved from scanning the two-dimensional bar code.

In step 50, the MIRS compares the previously obtained biometric data encoded in and the two-dimensional bar code with the currently obtained data biometric data provided by the user. If the two sets of data match, the retrieval system than provides the package to the user. As shown in step 60, the retrieval system may present the user with the package in order for the user to confirm that that is the actual package that is desired. In a further embodiment, the MIRS can arrange that the provider of the goods only charge the user's credit card once the user has actually retrieved the package. This can be accomplished without having the MIRS reveal the user's financial information to the provider.

In a further embodiment, the MIRS may employ the signature-capture system using electro-optical scanning as disclosed in U.S. Pat. No. 5,138,140, which is hereby incorporated by reference in its entirety. Two-dimensional information such as a written signature can be captured and subsequently reconstructed by using an electro-optical scanner. A multi-row preamble code and a multi-row postamble code flank the signature, and each code has a row identifier for identifying which row is being scanned by a scan line emitted by the scanner, as well as start/stop data for identifying when each scan line traverses the boundaries of a space containing the signature.

The occupied zones, i.e. those having parts of the signature, present a different light reflectivity to the scanner than the non-occupied zones, i.e. those having no parts of the signature. The occupied zones are akin to bars, while the non-occupied zones are akin to spaces of a UPC symbol. The occupied zones represent binary ones, and the non-occupied zones represent binary zeros. When a scan line of the scanner traverses a row of zones in the space, the occupied zones reflect less light than the non-occupied zones, and this light-variable information can be processed into data representative of the signature in a manner completely analogous to that are known in the art for processing a UPC symbol.

However, unlike a UPC symbol, which is one-dimensional and can be scanned and read by a scan line anywhere along its height (i.e. the transverse "Y" axis), a signature is two-dimensional since it contains different information in both the longitudinal ("X" axis) and the transverse ("Y" axis) directions. To decode a two-dimensional signature, it is further necessary to know which row of zones is being scanned by a particular scan line and also when each scan line enters and exits the space containing the signature.

The signature scanner uses a multi-row preamble code means, and a multi-row postamble code means, respectively located forwardly and rearwardly of the space as considered along the longitudinal direction. Each code means is a multi-tiered symbol structure having electro-optically scannable and readable encoded data arranged along the longitudinal and transverse directions. Each symbol structure can be a unique two-dimensional marking symbol structure, a tiered bar code, or a new symbol structure compatible with prevailing standard bar code symbology. As shown in FIG. 4A, each code means arranges its encoded data in a plurality of longitudinally-extending rows 1, 2, 3, 4 . . . N, where N is a substantially large enough number to provide adequate resolution of the signature. In theory, an infinite number of rows would provide the sharpest resolution, but, in practice, 25 rows are sufficient to provide an adequately resolved signature. The rows are tiered, i.e. stacked one above another, in the transverse direction. Each row of encoded data also includes synchronizing means, i.e. start/stop data, for identifying when each scan line traverses the anterior and posterior boundary lines of the signature space.

In a further embodiment, the scanning described above may be accomplished by the user using a device independent from the MIRS, such as, for example, a stand-alone portable scanning device or a scanner integrated into a cell phone, PDA, or pager.

The returns process is a large and looming problem for retailers, e-tailers, catalog companies and the USPS. The MIRS may be used in a similar manner for the return of packages to a provider. After notifying the provider of the goods that a return is desired, the provider can take the opportunity to ascertain why the user wishes to return the item. Such notification may be done by phone or over the Internet. Once the provider is notified, the provider can use the MIRS to electronically deliver a return receipt to the user. The user may then print the receipt, which will include a two-dimensional bar code including encoded biometric information of the user. The receipt may also include information about addressing the package for a return including the location of the MIRS, the address to which the package should be sent and postage return information. Such information may also be printed out as a separate mailing label, which may be affixed to the return package.

Similar to the acquisition process, the user brings the printed receipt to the MIRS. At this location the user then it provides the required biometric data to the MIRS. For example, the user may affix his or her signature on the printed receipt just prior to arriving at the package retrieval facility. At the package deposit facility which may be at a post office or other central location or even an the user's home, the user scans the two dimensional bar code and also provides the necessary biometric data to the retrieval system. The act of providing such data may be accomplished by signing the receipt in the space indicated and scanning the signature or by providing a retinal scan or handprint, fingerprint, voice print to the MIRS. Alternatively, the MIRS could use a camera to scan the facial features of the user and compare the biometric data retrieved from that scan with the biometric data retrieved from scanning the two-dimensional bar code. The user may then deposit the package in the MIRS in a secure manner.

In a further embodiment, the MIRS could analyze the returned package physical characteristics such as its size and weight to make a determination whether the goods to be returned are actually in the package. The MIRS would compare the measured physical characteristics of the package with those previously provided by the provider. If the analysis reveals that the actual package characteristics differ from the expected characteristics, the user at the MIRS could be given the opportunity to verify that the package actually contains the goods that are to be returned. If the analysis reveals that the actual package characteristics match the expected characteristics, the MIRS could arrange for the provider to immediately refund the purchase price by crediting the credit card of the user if the user has chosen to provide this information to the MIRS. Such a credit could be reversed by the MIRS if the provider later receives the package to find that the goods returned do not, in fact, match the goods expected.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method of obtaining a package, comprising:
   notifying a user electronically that a package has arrived at a predetermined location;
   generating a receipt including a two-dimensional bar code encoding the user's previously provided biometric information;
   at the predetermined location, scanning the two-dimensional bar code, decoding the two-dimensional bar code to obtain the user's previously provided biometric information and conveying a receiving user's current biometric information to a retrieval device; and
   if the receiving user's current biometric information is equivalent to the previously provided biometric information, providing the package to the receiving user.

2. The method of claim 1, further comprising:
   presenting the package for visual inspection by the receiving user prior to providing the package to the receiving user.

3. The method of claim 2, wherein the step of notifying the user electronically occurs via a cell phone.

4. The method of claim 2, wherein the step of notifying the user electronically occurs via a PDA.

5. The method of claim 2, wherein the step of notifying the user electronically occurs via a two-way pager.

6. The method of claim 2, wherein the previously provided biometric information and the current biometric information include fingerprint data.

7. The method of claim 2, wherein the previously provided biometric information and the current biometric information include handprint data.

8. The method of claim 2, wherein the previously provided biometric information and the current biometric information include voiceprint data.

9. The method of claim 2, wherein the previously provided biometric information and the current biometric information include facial feature data.

10. The method of claim 2, wherein the previously provided biometric information and the current biometric information include signature data.

11. The method of claim 10, wherein conveying the current biometric information is accomplished by:
affixing the receiving user's signature to a signature bar code; and
scanning the signature bar code.

12. The method of claim 2, wherein the two-dimensional bar code utilizes the PDF 417 symbology.

13. The method of claim 1, further comprising:
receiving a user notification indicating that the user desires to return the package;
notifying the user electronically that the package is ready to be accepted for return;
providing a return label including the two-dimensional bar code encoding the previously provided biometric information for affixing to the package;
scanning the two-dimensional bar code, decoding the two-dimensional bar code to obtain the previously provided biometric information, conveying a returning user's current biometric information;
comparing the returning user's current biometric information to the previously provided biometric information; and
accepting the package responsive to the returning user's current biometric information matching the previously provided biometric information.

14. The method of claim 13, further comprising querying the returning user regarding a reason for returning the package.

15. The method as in claim 13, further comprising:
ascertaining current physical dimension and weight parameters of the package and comparing the current physical dimension and weight parameters of the package with previously established physical dimension and weight parameters; and
if the current physical dimension and weight parameters are substantially equivalent to the previously established physical dimension and weight parameters, accepting the package by the service provider and crediting the user's financial account for the amount spent on the package.

16. The method of claim 13, wherein user notification is received via the Internet.

17. A method of obtaining a package, comprising:
generating a receipt including a two-dimensional bar code encoding an intended receiver's previously provided biometric information;
scanning the two-dimensional bar code and decoding the two-dimensional bar code to obtain the previously provided biometric information;
capturing a receiving user's current biometric information; and
comparing the current biometric information to the previously provided biometric information; and
providing the package to the receiving user responsive to the current biometric information matching the previously provided biometric information.

18. An apparatus for delivering goods, comprising:
a notification unit operable to notify a user that a package has arrived at a predetermined location;
a scanner operable to scan a two-dimensional bar code provided by a receiving user responsive to being notified of availability of the package, the two-dimensional bar code encoding previously provided biometric information associated with an intended receiver of the package;
a collector operable to collect the receiving user's current biometric information; and
a comparator operable to compare the current biometric information and the previously provided biometric information and determine that the package can be provided to the receiving user responsive to the current biometric information matching the previously provided biometric information.

19. The apparatus of claim 18, wherein the previously provided biometric information and the current biometric information include fingerprint data.

20. The apparatus of claim 18, wherein the previously provided biometric information and the current biometric information include handprint data.

21. The apparatus of claim 18, wherein the previously provided biometric information and the current biometric information include voiceprint data.

22. The apparatus of claim 18, wherein the previously provided biometric information and the current biometric information include facial feature data.

23. The apparatus of claim 18, wherein the previously provided biometric information and the current biometric information include signature data.

24. The apparatus of claim 18, wherein the two-dimensional bar code utilizes the PDF 417 symbology.

* * * * *